United States Patent
Nargi

(10) Patent No.: US 8,132,770 B2
(45) Date of Patent: Mar. 13, 2012

(54) STEMWARE HOLDER

(76) Inventor: Michael A. Nargi, Southwick, MA (US)

(*) Notice: Subject to any disclaimer, the term of this patent is extended or adjusted under 35 U.S.C. 154(b) by 231 days.

(21) Appl. No.: 12/630,540

(22) Filed: Dec. 3, 2009

(65) Prior Publication Data

US 2010/0176139 A1    Jul. 15, 2010

Related U.S. Application Data

(60) Provisional application No. 61/204,997, filed on Jan. 14, 2009.

(51) Int. Cl.
    *B65D 25/20*    (2006.01)
    *B65D 25/24*    (2006.01)

(52) U.S. Cl. ............ 248/311.2; 220/737; 224/926; D7/620; D7/396.2; D9/455

(58) Field of Classification Search ............ 220/737, 220/23.83, 23.86, 630; D7/620, 396.2; D9/455; 224/483, 926
See application file for complete search history.

(56) References Cited

U.S. PATENT DOCUMENTS

| | | | | |
|---|---|---|---|---|
| 5,029,720 A * | 7/1991 | Bridges | ............ | 220/737 |
| 5,088,673 A * | 2/1992 | Chandler | ............ | 248/311.2 |
| 5,285,953 A * | 2/1994 | Smith | ............ | 220/737 |
| 5,397,089 A * | 3/1995 | Kataoka | ............ | 248/311.2 |
| 5,419,455 A * | 5/1995 | Russeau | ............ | 220/575 |
| 5,897,041 A * | 4/1999 | Ney et al. | ............ | 224/483 |
| 6,059,138 A * | 5/2000 | Labruyere | ............ | 220/574 |
| D453,095 S * | 1/2002 | Bailey | ............ | D7/620 |
| 7,422,184 B2 * | 9/2008 | Carnevali | ............ | 248/278.1 |
| 7,611,114 B1 * | 11/2009 | Griffin | ............ | 248/311.2 |

* cited by examiner

*Primary Examiner* — Mickey Yu
*Assistant Examiner* — Niki Eloshway
(74) *Attorney, Agent, or Firm* — Alix, Yale & Ristas, LLP

(57) ABSTRACT

A stemware holder maintains a piece of stemware in an upright position even during turbulent conditions. An embodiment has a base extending downward from a cap. The cap has a lower portion with a flat surface and an upper portion with two prongs that define a slot. A wall extends around part of the perimeters of the upper and lower portions and has a front opening. The upper and lower portions, partial perimeter wall, and front opening define a groove. The groove narrows slightly from the front to the rear. The stemware holder base is insertable into the recess of a standard cup holder. The base of a piece of stemware can be slid into the groove through the front opening with the stem extending through the slot. The prongs and groove collectively assist in maintaining the stemware upright. Another embodiment employs a similar cap that is fixable directly to a surface without insertion into a cup holder recess.

18 Claims, 6 Drawing Sheets

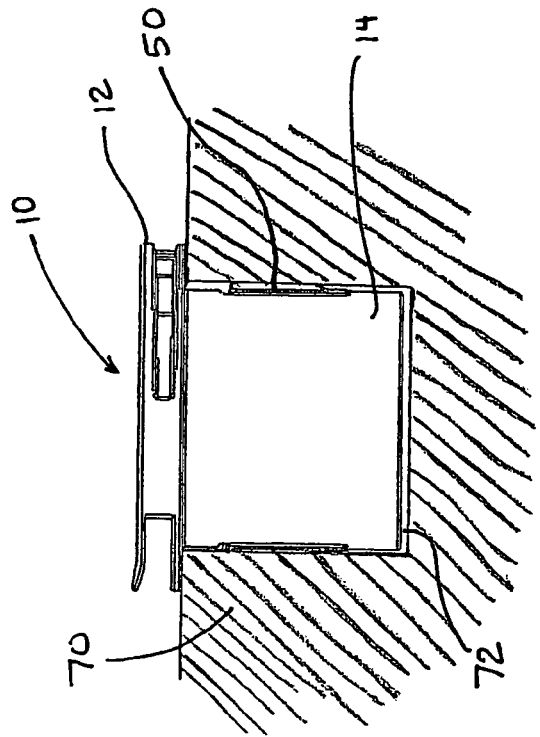
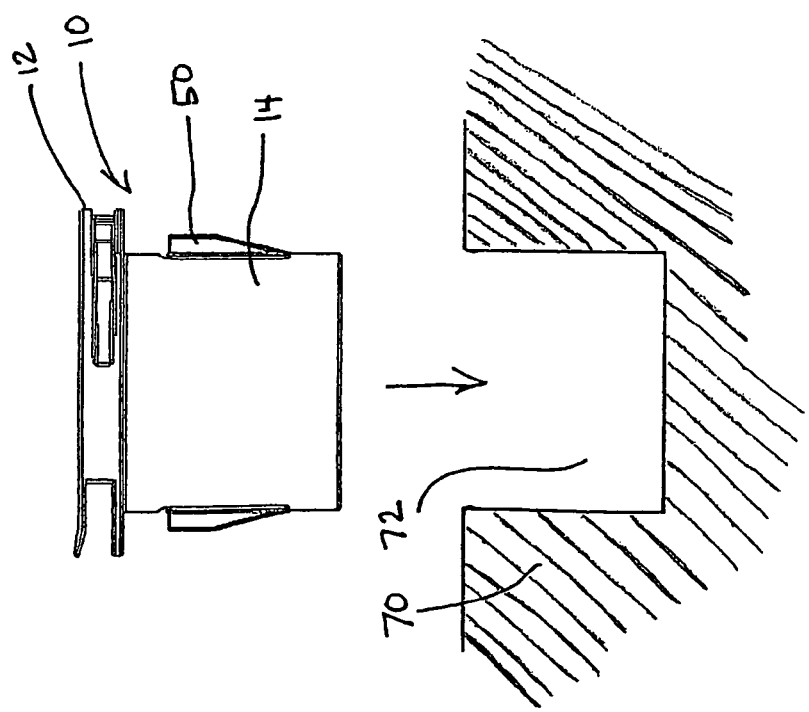
FIGURE 4B
FIGURE 4A

STEMWARE HOLDER

CROSS REFERENCE TO RELATED APPLICATION

This application claims the benefit of U.S. Provisional Application No. 61/204,997, filed Jan. 14, 2009 for "STEMWARE HOLDER INSERT", the disclosure of which is incorporated herein by reference in its entirety.

FIELD

The present disclosure relates generally to a holder for stemware and, more specifically, to a stemware holder for insertion into an existing cup holder with a recess or for attachment to a surface.

RELATED ART

It can be appreciated that stemware, such as wine, champagne, margarita or martini glasses, can easily tip by direct contact or turbulent conditions, causing spilling and potentially staining clothing and furniture, amongst other belongings. Various devices for maintaining a piece of stemware in its upright position, and thus preventing spilling, are known in the art. Keeping stemware upright can be particularly challenging in turbulent environments, such as on a boat in a body of water and/or windy weather conditions. For this reason, boat passengers are oftentimes relegated to drinking their fine wines, champagnes or other beverages out of ordinary drinking containers like cups or mugs in order to employ conventional cup holders on board to prevent spilling. There is a need for a device that rigidly and sturdily supports a piece of stemware in the upright position by utilizing a conventional vehicle cup holder or by attachment to a surface.

SUMMARY

There is a need for a removable stemware holder for installation into a conventional cup holder of a vehicle that allows quick and simple insertion and removal of a piece of stemware and securely maintains an inserted piece of stemware in the upright position.

According to one embodiment of the disclosed device, an insert for holding a piece of stemware having a stem extending between a bowl and a base in an upright position for use with a cup holder is provided. The insert has a base configured for receipt by the cup holder recess. An upper cap is attached to the base. The upper cap defines a groove configured to receive and rigidly maintain the stemware base.

In another embodiment, an insert for holding a piece of stemware in an upright position for use with a cup holder with a recess is provided. The insert has a cap with generally circular top and bottom portions and an outer radial wall. The bottom portion is generally flat and has an upper surface, lower surface and edge. The top portion has an upper surface, lower surface and an edge. A slot extends inwardly from the top portion edge. The top and bottom portions are substantially coaxial. The outer perimeter wall axially separates the top and bottom portion and has a front opening. The front opening, perimeter wall and top and bottom portions collectively define an inner groove. A base extends substantially coaxially from the lower surface of the bottom portion of the cap. The base is configured for removable engagement with the cup holder. The stemware base is removably insertable into the groove through the opening in the radial wall with the stem extending through the slot. The top portion of the cap is configured to exert pressure on the stemware base in the direction of the bottom portion, thereby maintaining the stemware base in an upright position.

In yet another embodiment, a stemware holder for maintaining a piece of stemware having a stem separating a bowl and a base in an upright position is provided. The holder has a cap and a means for rigidly attaching the cap to a surface. The cap has a lower portion, upper portion and partial perimeter wall. The lower portion defines a surface and a perimeter. The upper portion is axially spaced from the lower portion and has a perimeter that is substantially identical to the lower portion perimeter. A radial shoulder extends inwardly from the upper portion perimeter and defines a central opening. Two identical prongs in the upper portion are spaced from each other and extend inwardly toward the central opening. The prongs define a slot therebetween. The partial perimeter wall axially spaces the upper and lower portions from each other and has a front opening. The upper and lower portions, perimeter wall and front opening define a groove. After the cap is attached to a surface, the stemware base is insertable into the groove by sliding the stemware base through the front opening with the stem extending through the slot and central opening. The stemware is rigidly maintained in an upright position when the stemware base is in the groove.

BRIEF DESCRIPTION OF THE DRAWINGS

Aspects of the preferred embodiment will be described in reference to the Drawings, where like numerals reflect like elements:

FIG. 4 shows the insertion of the disclosed stemware holder into the recess of a cup holder;

DETAILED DESCRIPTION

With reference to the drawings wherein like numerals represent like parts throughout the Figures, a stemware holder for holding a piece of stemware in an upright position is disclosed. Embodiments allow passengers in or on vehicles such as a boat to enjoy wine, champagne, martinis, margaritas or the like out of proper stemware without fear of spilling by easily inserting the stemware base into a groove in the insert which maintains the stemware upright. The passenger can easily remove and re-insert the stemware as desired. A preferred embodiment of the stemware holder is for use with a cup holder.

Figure 1:
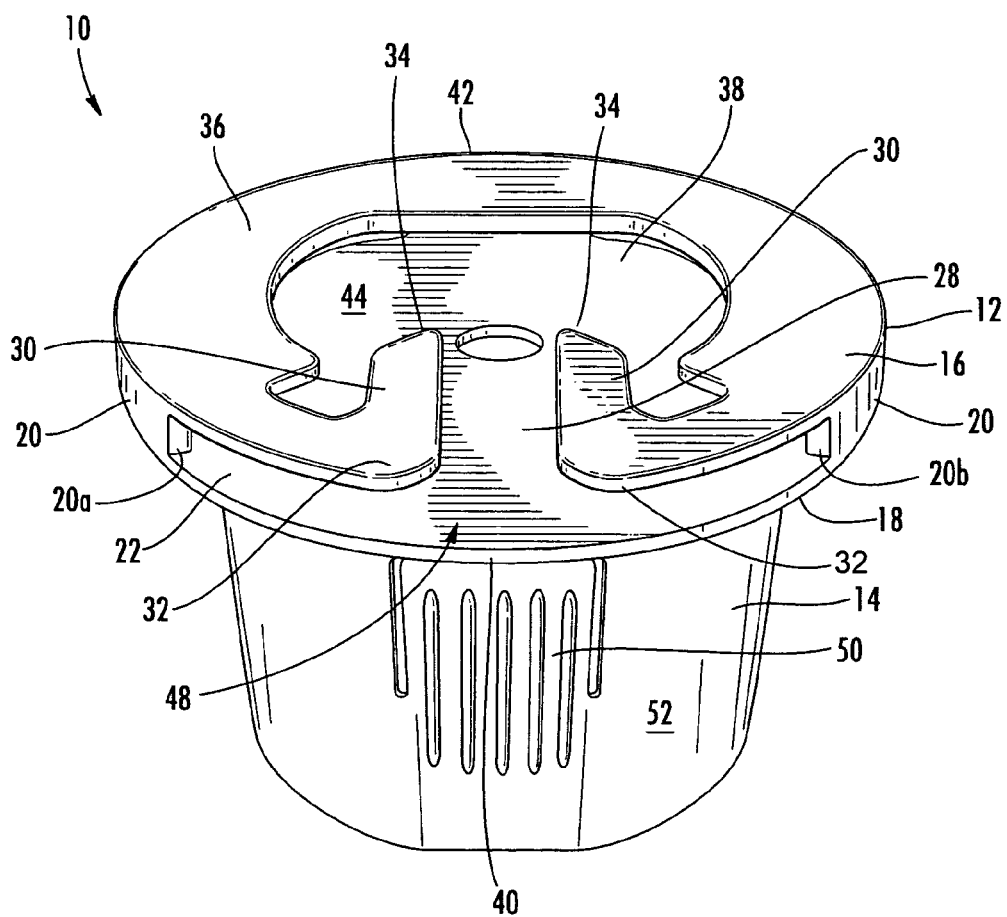
FIG. 1 is a front elevation view of a stemware holder according to the present disclosure.
Figure 2:
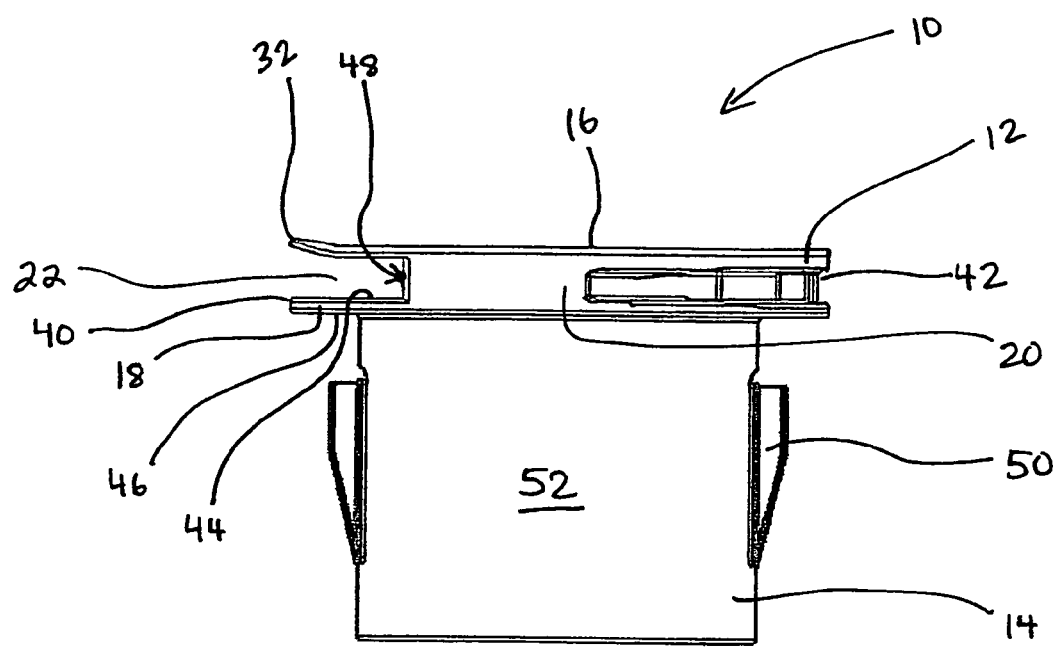
FIG. 2 is a profile view of the stemware holder of FIG. 1.

In a preferred embodiment shown in FIGS. 1 and 2, a stemware holder 10 configured for insertion into the recess of a cup holder has a cap 12 fixed on a base 14 in a substantially coaxial arrangement. The cap has an upper portion 16 and a lower portion 18 axially separated by a partial perimeter wall 20. The respective perimeters of the upper and lower portions 16 and 18 have substantially similar shapes. As indicated in FIG. 1, the cap wall 20 extends partially around the perimeters of the upper and lower portions, 16 and 18. The opposite ends 20a and 20b of the partial perimeter wall 20 define a front opening 22.

As shown in FIG. 1, extending inward from the upper portion perimeter is a slot 28. In this embodiment, two generally parallel prongs 30 in the upper portion 16 define the slot 28. The prongs 30 extend from a proximal end 32 to a distal end 34. The upper portion 16 also has a partial radial shoulder 36 extending inwardly from the perimeter wall 20. The shoulder 36 defines a generally central opening 38 in the upper portion 16. As shown in depicted embodiment, the slot 30 is preferably positioned generally midway between the opposite ends 20a and 20b of the partial perimeter wall. However, this particular position is not limiting. For the herein description, the radial end of the cap from which the slot extends is the "front" (40) and the opposite end is the "rear" (42).

As noted, the lower portion 18 of the cap 12 has a perimeter that is similar or identical in shape to the upper portion 16. The lower portion 18 has a top surface 44 and bottom surface 46. The lower portion top surface 44 is configured to be generally flat when the insert 10 is in use. The lower portion 18, upper portion 16, partial perimeter wall 20 and front opening 22 collectively define a groove 48.

As shown in FIGS. 1 and 2, the base 14 extends substantially coaxially from the lower portion bottom surface 46. The base 14 is configured to be removably insertable into a standard cup holder in a vehicle, like that depicted as Reference Numeral 70 in FIGS. 4A and 4B. In this particular embodiment the base 14 has an opposite pair of wings 50 extending outwardly from the outer surface 52 of the base 14. The wings 50 are inwardly flexible to assist in creating a secure relationship with the cup holder 70 upon insertion. Notably, the particular quantity, shape and/or relative position of the wings 50 on the base 15 is not limiting.

Figure 3:
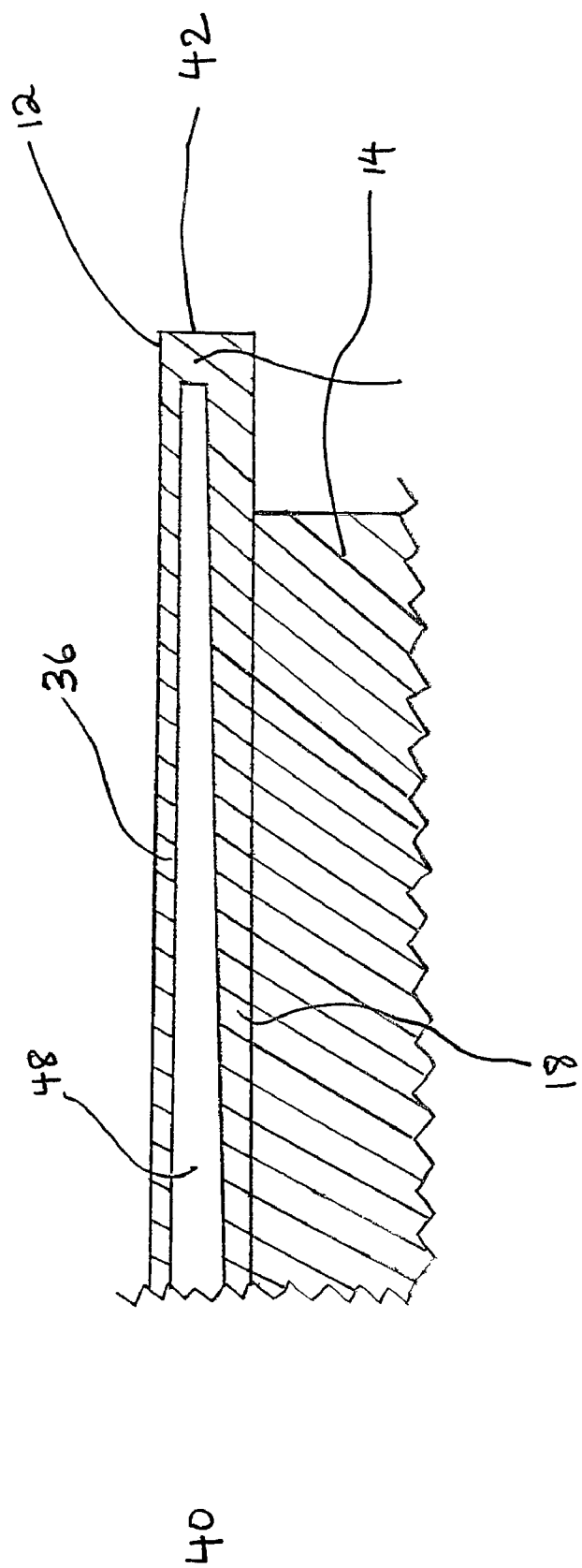
FIG. 3 is a cross section of the rear of the cap of the stemware holder of FIGS. 1 and 2, showing the increase in thickness of the bottom surface from the front end to the rear end of the cap.

With reference to FIG. 3, it can be seen that the lower portion 18 of the cap 12 increases slightly in thickness from the front 40 to the rear 42. The increase in thickness results in a groove 48 that gradually narrows from the front 40 to the rear 42. Additionally, the prongs 30 are configured to angle slightly downward from the proximal ends 32 to the distal ends 34. In one particular embodiment, the radial shoulder 36 defines an upper plane and the proximal and distal prong ends 32 and 34 are positioned on opposite sides of the plane, at least when a piece of stemware is not inserted.

Figure 5:
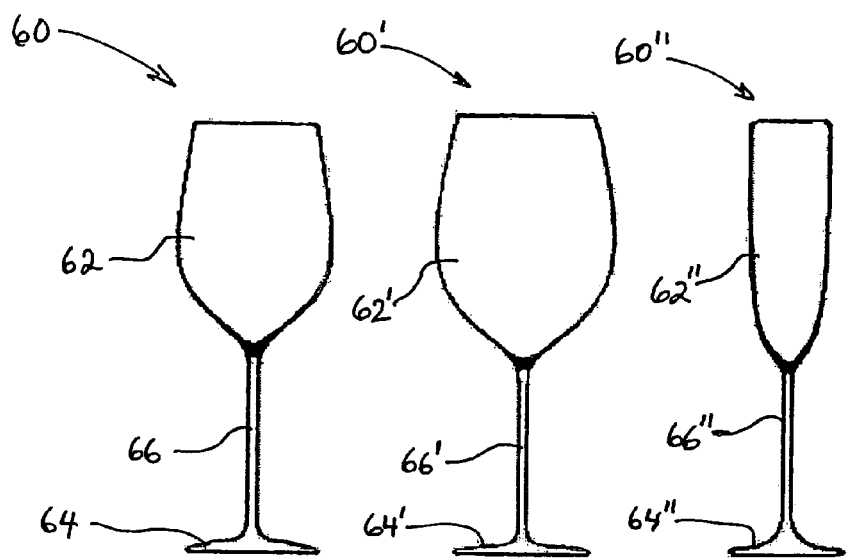
FIG. 5 shows several common varieties of stemware.

FIG. 5 depicts three common varieties of stemware, 60, 60' and 60", each having a bowl (62, 62', 62") and a base (64, 64' and 64") separated by a stem (66, 66', 66"). Of course, the holder 10 according to the disclosure can be used with any stemware and is not limited to the varieties depicted in FIG. 5.

As shown in FIGS. 4A and 4B, the insert 10 can be employed by first inserting the base 64 into the recess 72 of an appropriate cup holder 70 (FIG. 4A) until the cap is positioned with the top surface 44 of the lower portion 18 lying relatively flat (FIG. 4B).

Figure 7B:
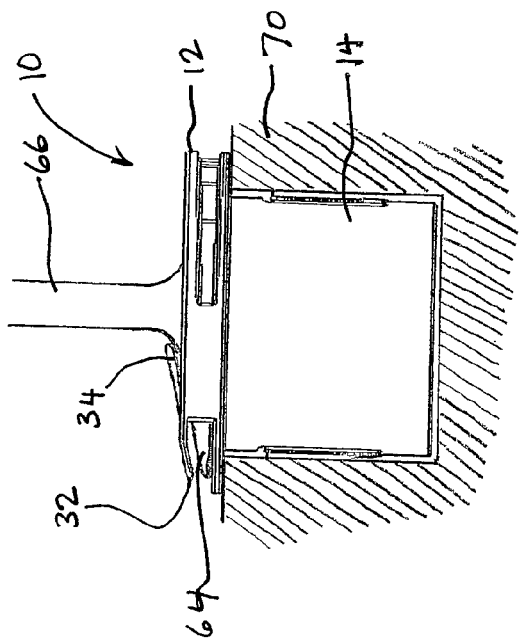
FIGS. 7A and 7B depict a profile view of the insertion of a piece of stemware into the stemware holder of FIGS. 1 and 2.
Figure 7A:
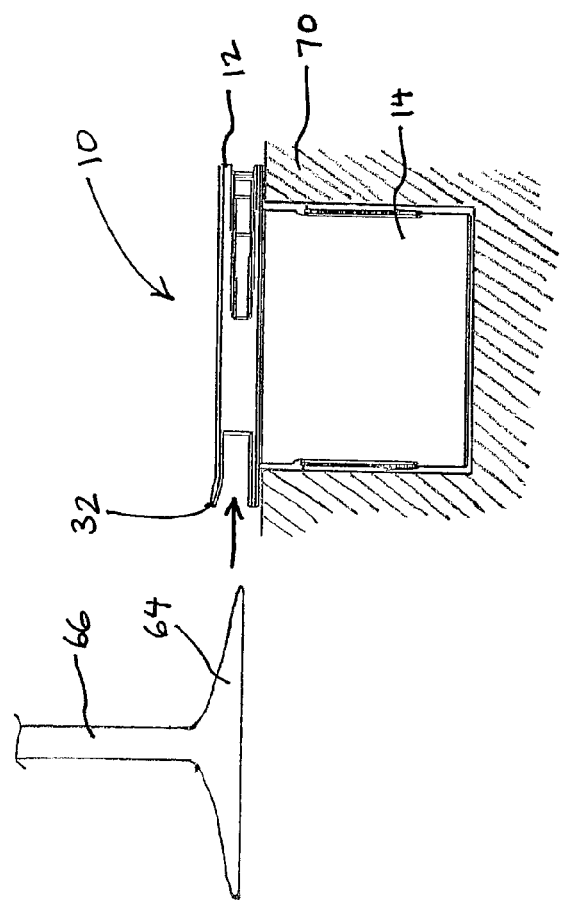

As shown in the representative side profile depictions of FIGS. 7A and 7B, a user can manually slide the base 64 of his stemware through the front opening 22 into the groove 48 of the cap 12. The stem 66 extends through the slot 28 during insertion and extends through the central opening 38 when the base 64 is within the groove 48. The prongs 20 are not completely rigid in the axial direction, and thus the distal ends 34 flex upward upon insertion of the stemware base 64 into the groove 48. When the stemware is in the inserted position, the prongs 20 apply a modest force upon the stemware base 64 in the direction toward the lower portion 18. Additionally, as seen in FIG. 7B, the upward flexing of the prong distal ends 34 causes a modest dipping of the proximal ends 32 at the edge of the stemware base 64. The frictional forces collectively created by the slightly narrowed groove 48 and the configuration of the prongs 30 wedge and firmly maintain the stemware base 64 within the groove 48 after insertion. As a result, the stemware 60 is maintained in the upright position through turbulent and/or windy conditions. An individual can easily take a sip of his beverage as desired by sliding the stemware base 64 out of the groove 48 through the front opening 22. The user can then re-insert the stemware as previously described.

Many elements of the stemware holder 10 can be altered as desired without departing from the scope of the inventive stemware holder disclosed herein. For example, the sizes and shapes of the slot 28, central opening 38 and groove 48 can all be adapted for use with stemware having different sized or shaped bases and stems. Likewise, the shape, angle and flexibility of the prongs 30 can vary as desired. Obviously, these particular examples of variables are not limiting.

Figure 6:
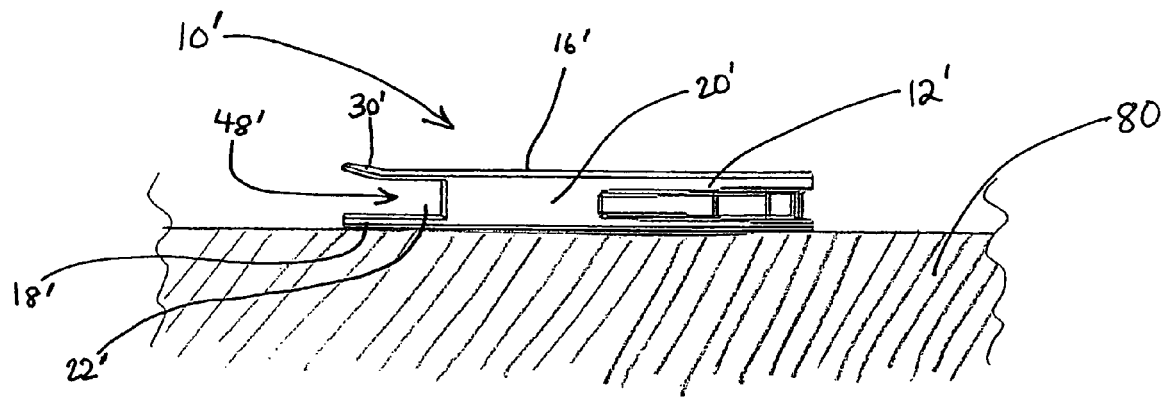
FIG. 6 shows another stemware holder embodiment according to the disclosure.

In another embodiment, depicted in FIG. 6, a stemware holder 10' comprises a cap portion 12' without a base extending therefrom. The cap 12' is virtually identical to that of the holder 10 in FIGS. 1 and 2 with a groove 48' defined by a partial perimeter wall 20' with an opening 22' and upper and lower portions, 16' and 18', respectively. Like the previous embodiment, the upper portion 16' has prongs 30' that define a slot (not seen in FIG. 6). However, this embodiment is configured to be fixable directly to a surface 80 by adhesive, suction, cooperating hook-and-pile fasteners or another similar attachment method. Alternatively, the stemware holder 10' can comprise a clip for attachment to a fixed body such as a shelf or railing (clip embodiment not shown).

A preferred embodiment of the stemware holder 10 is a single moulded piece of a polymeric material, such as plastic. However, other embodiments exist wherein multiple components, such as a cap 12 and base 14, are joined together by welding, adhesive or a similar method of attachment. Likewise, other relatively rigid, but flexible materials can be employed, such as some metals. The insert 10 can also comprise a combination of different materials.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:
1. A stemware holder for maintaining a piece of stemware having a stem extending between a bowl and a base in an upright position for use with a cup holder with a recess, comprising:
  a base configured for rigid receipt by the cup holder recess; and
  an upper cap having
    a top portion with a partial radial shoulder extending inwardly from a perimeter,
    a bottom portion spaced from the top portion by a partial perimeter rim,
  wherein
    the spaced top and bottom portions define a groove,
    the partial perimeter rim has an opening,
    the shoulder defines a central opening, and
    the top portion has two laterally spaced prongs extending from proximal to distal ends and defining a slot extending from the top portion perimeter to the central opening, and
    the groove is configured to receive and rigidly maintain the stemware base with the prongs exerting pressure on the stemware base in the direction toward the bottom portion when the stemware base is within the groove.

2. The stemware holder of claim 1, wherein the radial shoulder defines an upper plane and the prongs extend obliquely into the groove, the proximal and distal prong ends being on opposite sides of the upper plane.

3. The stemware holder of claim 1, wherein a piece of stemware is removably insertable into the groove by sliding the stemware base through the front opening with the stem extending through the slot.

4. The stemware holder of claim 1, wherein the partial perimeter rim opening has two opposite closed ends and the slot is positioned angularly midway between said closed ends.

5. The stemware holder of claim 1, wherein the groove narrows from a perimeter front to a perimeter rear.

6. The stemware holder of claim 5, wherein the position along the perimeter from which the slot extends defines the perimeter front.

7. The stemware holder of claim 5, wherein the cap bottom portion gradually increases in thickness from the perimeter front to the perimeter rear.

8. The stemware holder of claim 1, wherein the base has an outer surface, comprising a plurality of wings projecting outwardly from the base outer surface to assist in creating a rigid connection with the cup holder when the base is inserted into the recess.

9. The stemware holder of claim 8, wherein the wings are inwardly flexible and create said rigid connection by friction with the cup holder.

10. The stemware holder of claim 1, comprising a single piece of molded polymer material.

11. A stemware holder for maintaining a piece of stemware having a stem separating a bowl and a base in an upright position, for use with a cup holder with a recess, comprising:
a cap having
a generally circular bottom portion with an upper surface, lower surface and edge,
a top portion with an upper surface, lower surface, edge, a radial shoulder extending inwardly from the edge and defining a central opening, and two substantially identical prongs extending from a proximal end at the edge to a distal end and defining a slot extending inwardly from the edge, the top and bottom portions being substantially coaxial and the top and bottom portion edges being substantially like-shaped,
an outer perimeter wall with a front opening positioned at the respective edges and axially separating the bottom and top portions, the front opening, perimeter wall and top and bottom portions collectively defining an inner groove that narrows from proximate the front opening toward a rear of the groove; and
a base extending substantially coaxially from the lower surface of the bottom portion configured for removable engagement with the cup holder; wherein
the stemware base is removably insertable into the groove through the front opening with the stem extending through the slot, and the top portion is configured to exert pressure on the base in the direction toward the bottom portion thereby rigidly maintaining the stemware base in an upright position.

12. The stemware holder of claim 11, wherein the radial shoulder defines an upper plane and the prongs extend obliquely into the groove from a proximal end to a distal end, the proximal and distal ends being on opposite sides of the upper plane.

13. The stemware holder of claim 11, wherein the cap lower surface gradually increases in thickness from the front opening toward the rear of the groove.

14. The stemware holder of claim 11, comprising a single piece of molded polymer material.

15. A stemware holder for maintaining a piece of stemware having a stem separating a bowl and a base in an upright position, comprising:
(a) a cap having
(i) a lower portion defining a surface and a perimeter,
(ii) an upper portion axially spaced from the lower portion having a perimeter that is substantially identical to the lower portion perimeter, a radial shoulder extending inwardly from the perimeter and defining an upper plane and a central opening, and two identical prongs spaced from each other extending inwardly toward the central opening obliquely into the groove from a proximal end on one side of the upper plane to a distal end on the opposite side of the upper plane, the prongs defining a slot therebetween, and
(iii) a partial perimeter wall axially spacing the top and bottom portions from each other and having a front opening, the upper and lower portions, perimeter wall and front opening defining a groove; and
(b) a means for rigidly attaching the cap to a surface; wherein
after the cap is attached to said surface, a stemware base is insertable into the groove by sliding the stemware base through the front opening with the stem extending through the slot and central opening, the stemware being generally rigidly maintained in an upright position when the stemware base is in the groove.

16. The stemware holder of claim 15, wherein the location in the perimeter from which the slot extends defines a front and the opposite perimeter end defines a rear, and the groove narrows from said front to said rear.

17. The stemware holder of claim 15, wherein the prongs are configure to exert pressure on the stemware base in the direction toward the lower portion when the stemware base is within the groove.

18. The stemware holder of claim 15, comprising a single piece of molded polymer material.

* * * * *